Nov. 9, 1971   H. GEISTHOFF ET AL   3,618,340
TELESCOPING UNIVERSAL JOINT SHAFT
Filed July 29, 1970                                   2 Sheets-Sheet 1
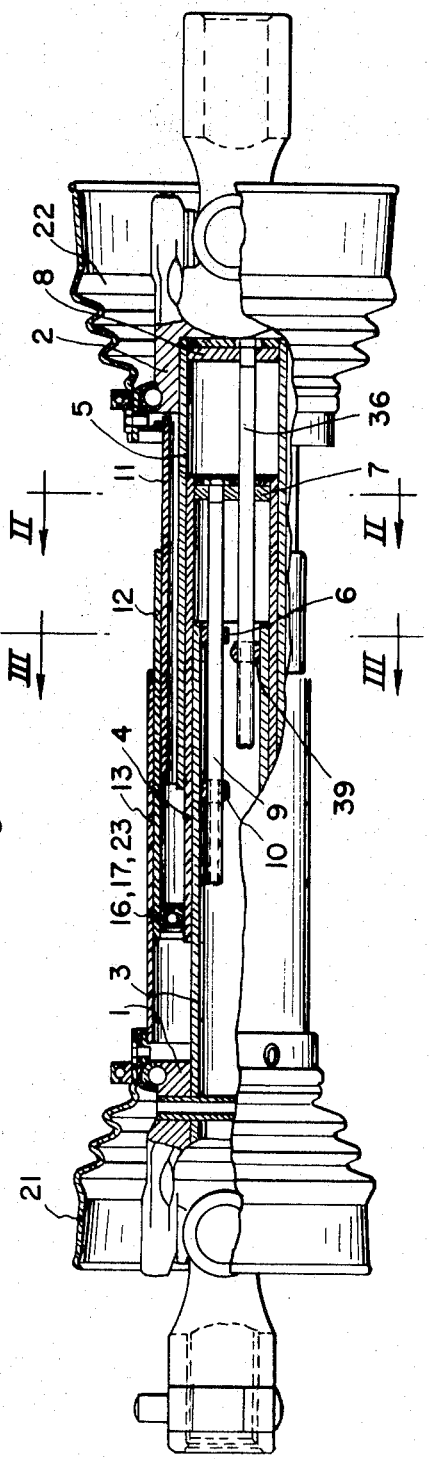
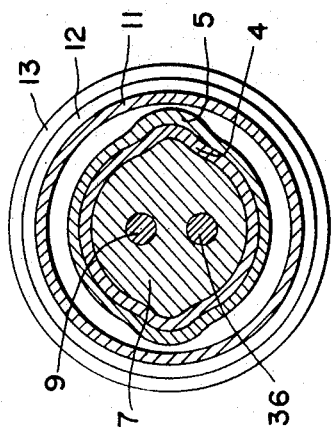
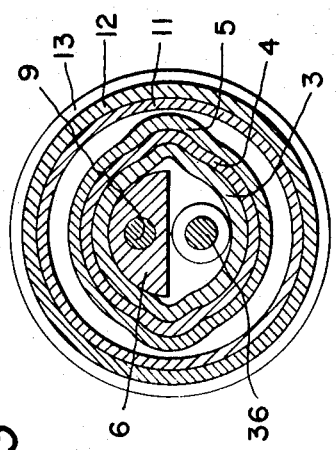
INVENTORS
HUBERT GEISTHOFF
HEINRICH WELSCHOF
BY Edmund M. Jaskiewicz
ATTORNEYS Nov. 9, 1971  H. GEISTHOFF ET AL  3,618,340
TELESCOPING UNIVERSAL JOINT SHAFT
Filed July 29, 1970  2 Sheets-Sheet 2

INVENTORS
HUBERT GEISTHOFF
HEINRICH WELSCHOF

BY Edmund M. Jaskiewicz
ATTORNEYS

United States Patent Office 3,618,340
Patented Nov. 9, 1971

3,618,340
TELESCOPING UNIVERSAL JOINT SHAFT
Hubert Geisthoff, Donrath, and Heinrich Welschof, Geber,
Germany, assignors to Jean Walterscheid KG, Lohmar,
Germany
Filed July 29, 1970, Ser. No. 59,308
Claims priority, application Germany, Aug. 28, 1969,
P 19 43 837.0
Int. Cl. F16d 3/06
U.S. Cl. 64—23                                  5 Claims

ABSTRACT OF THE DISCLOSURE

A shaft for transmitting torque between two universal joints comprises three telescoping tubular shaft members axially moveable with respect to each other and enclosed by three telescoping protective tubular members also axially moveable. Stop means are provided on the inner and outer tubular shaft members engageable with portions of the intermediate tubular shaft member for limiting its axial movement. The intermediate protective tube member is journaled on the intermediate shaft member with both intermediate members being moveable together.

---

The present invention relates to universal joint shafts, more particularly, to such a shaft having telescoping tubular members enclosed by telescoping protective members.

In many forms of machinery, and particularly in agriculture machines, a universal joint shaft is used to connect two universal joints with one of the universal joints usually being connected to a power shaft. Protective or guard structures are generally provided to enclose the entire shaft and also the connections at each end to the universal joints. Not only must such a shaft transmit torque but under certain operating conditions it is desirable that the shaft be variable in length. Further, a variable length universal joint shaft has the advantage of a wider range of uses. The variable length feature of such a shaft is generally achieved by constructing the shaft of telescoping elements which are slidable with respect to each other. However, such telescoping shafts have not been generally satisfactory since under certain operating conditions considerable resistance was encountered in the telescoping displacement of the shaft components. In addition, difficulties were encountered in limiting the relative axial movement of the shaft components and also in providing proper guards or protective devices for the shaft whose length would correspondingly adjust to variations in the length of the shaft.

It is therefore the principal object of the present invention to provide a novel and improved universal joint shaft enclosed by a protective sleeve.

It is another object of the present invention to provide a universal joint shaft having telescoping components and enclosed by a telescoping protective sleeve which together with the shaft constitutes a self-contained unit assembly.

It is a further object of the present invention to provide a telescoping universal joint shaft whose components are axially displaceable with respect to each other with a minimum of resistance under all operating conditions and can contract to its shortest length and extend to its longest length without the possibility of separation of its components.

According to one aspect of the present invention a universal joint shaft comprises inner and outer telescoping tubular shaft members which are axially moveable with respect to the other with each of the shaft members being connected to an element of a terminal universal joint. The shaft members are provided with a cross section configuration which is suitable for the transmission of torque. An intermediate tubular shaft member is telescopingly positioned between the inner and outer tubular members and has portions thereof engageable with stop members on the inner and outer tubular shaft members for limiting the axial movement of the intermediate tubular shaft member. The shaft members are enclosed by inner and outer telescoping protective tubular members with each of these protective members being rotatably mounted on an element of the terminal universal joints. An intermediate protective tubular member is telescopingly positioned between the inner and outer protective tubular members. The intermediate protective tubular member is journaled by anti-friction bearings upon the intermediate shaft member so that both intermediate members are axially positioned with respect to each other and move in unison.

Other objects and advantages of the present invention will be apparent upon reference to the accompanying description when taken in conjunction with the following drawings, which are exemplary, wherein:

FIG. 1 is a partial longitudinal sectional view of a universal joint shaft according to the present invention;

FIG. 2 is a sectional view taken along the line II—II of FIG. 1;

FIG. 3 is a sectional view taken along the line III—III of FIG. 1; and

Proceeding next to the drawings wherein like reference symbols indicate the same parts throughout the various views a specific embodiment and a modification of the present invention will be described in detail.

Figure 4:
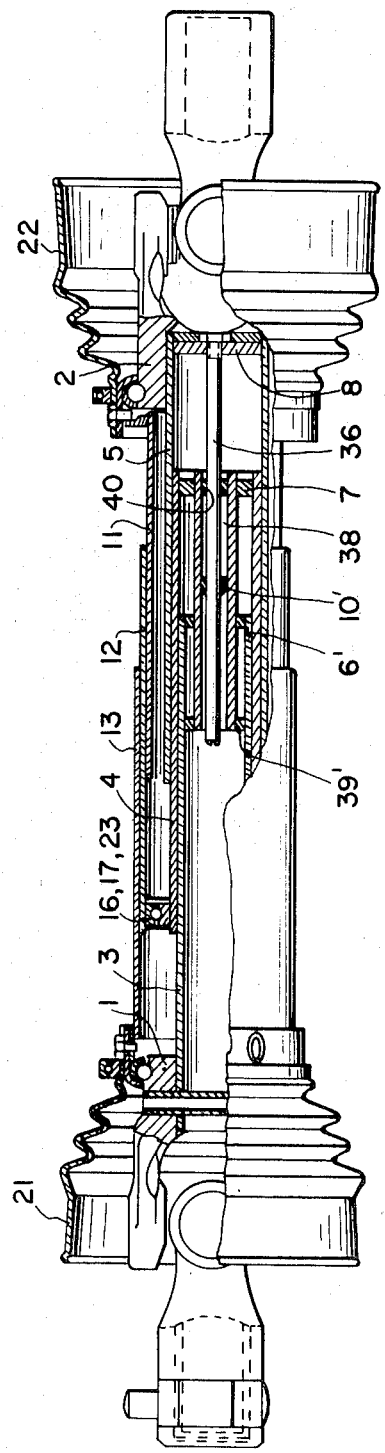
FIG. 4 is a partial longitudinal sectional view similar to that of FIG. 1 and showing a modification of the present invention.

As may be seen in FIG. 1, the universal joint shaft interconnects a pair of terminal universal joints having an element 1 and the other joint having an element 2. The universal joint shaft comprises an inner tubular member 3 having one end connected to the universal joint element 1 and an outer tubular member 5 connected to the element 2 of the other universal joint. An intermediate tubular member is positioned between the inner and outer tubular members in telescoping relationship therewith and is slideable with respect to these members in an axial direction.

As may be seen in FIG. 3, the tublular members 3, 4 and 5 of the universal joint shaft are provided with a cross section configuration which is suitable for transmitting a torque. The configuration may be such that portions of the telescoping tubular members interengage as shown in FIG. 3.

One end of the intermediate tubular member 4 is closed by a plate or plug 7 and the end of the outer tubular member 5 which is connected to the universal joint element 2 is similarly closed by a plug or plate 8. A rod 9 has one end fixed in the plate 7 and extends inwardly of the intermediate tubular member 4 to project into the inner tubular member 3. The free end of rod 9 is threaded and a stop member 10 may be selectively positioned on the free end of the rod 9. The rod 9 may be screwed or otherwise firmly secured into the plate 7.

The rod 9 is eccentrically mounted with respect to the intermediate tubular member 4 and passes through an opening 6 formed in a bracket secured within the inner surface of the inner tubular member 3.

In a similar manner a rod 36 has one end mounted in the plate 8 and extends parallel to the center longitudinal axis of the outer tubular member 5. The rod 36 is similarly eccentrically positioned with respect to this tubular member and passes through an opening in the plate 7 with its free end extending into the intermediate tubular member 4. The free end of the rod 36 is similarly threaded and carries a stop member 39 which may be selectively positioned on the free end.

The universal joint shaft comprising the three tubular members 3, 4 and 5 is enclosed by a telescoping protective sleeve comprising an outer protective tubular member 13 which is rotatably mounted by means of anti-friction ball bearings on the universal joint member 1 and is provided with a terminal protective cup 21 which extends over this universal joint. In a similar manner, an inner protective tubular member 11 is telescopingly positioned with respect to the outer tubular member 13 and has one end rotatably mounted by means of anti-friction ball bearings on the universal joint element 2. A protective terminal cup 22 extends from this end of the tubular member 11 over the universal joint.

A central or intermediate protective tubular member 12 is telescopingly positioned between the inner and outer protective tubular members 11 and 13 and is attached to the intermediate shaft tubular member 4 by means of an anti-friction ball bearing assembly 16, 17, 23. As result of this connection, the intermediate protective tubular member 12 is free to rotate concentrically with respect to the intermediate tubular shaft member 4 but is retained against axial displacement with respect to the tubular member 4 by means of the above described anti-friction bearing assembly.

In the embodiment of FIG. 1 as described above the axial displacement of the intermediate tubular member 4 with respect to the inner tubular member 3 is limited by the stop member 10 engaging the bracket with the opening 6. In a like manner, the axial displacement of the outer tubular member 5 with respect to the intermediate tubular member 4 is limited by the stop member 39 engaging the inner face of the plate 7 in the intermediate member. Thus, the axial displacement of the intermediate tubular member 4 is limited to movement between the two stops 6 and 39.

The axial displacement of the three tubular members of the universal joint shaft may be limited by other arrangements of stops but which achieve the same functional effect, namely, limiting of the axial displacement.

In FIG. 4 there is illustrated a modified arrangement of stop members for limiting the axial displacement of the tubular members. The plate 8 in the end of the outer tubular member 5 is welded within the tubular member and supports one end of a rod 36' positioned centrally within the tubular member along its longitudinal axis. The free end of the rod 36' extends inwardly of the intermediate tubular member 4 and carries a stop member 10'. The rod 36' passes through a tube 38 which has one end mounted within the plate 7 of the intermediate member 4 and extends into the inner tubular member 3. The mounted end of the tube 38 is provided with an internal ring 40 and its other or free end provided with an external ring 39'. The stop member 10' on the rod 36' is engageable with the internal ring 40 and the external ring 39' is engageable with an internal ring 6' positioned within the free end of the inner tubular member 3 to limit the axial displacement of the intermediate member 4.

When the tubular members of the universal joint shaft move axially with respect to each other the displacement of each tubular member is limited by a stop arrangement as described above and it is impossible for the tubular members to become accidentally separated. The protective sleeve which similarly comprises three telscoping tubular members 11, 12 and 13 automatically adjusts itself according to the axial positions of the tubular members of the shaft because the intermediate protective tubular member 12 is coupled axially to the intermediate shaft tubular member 4. Further, there is no possibility of the protective sleeve being separated from the shaft because there is a positive and reliable connection between the protective sleeve and the shaft in any position of the shaft.

It is thus apparent that the three member universal joint shaft and three member protective sleeve according to the present invention combine the advantages of short length when contracted with that of considerable extensibility. The present arrangement also eliminates the possibility of separation of members of the shaft and provides for a minimum resistance to telescoping displacement of these members under all operating conditions. This is true even when some members of the telescoping assembly reach their limit stops and cannot be further axially displaced. The several components of the shaft assembly are of simple structure which enables the shaft to be manufactured at relatively small expense. Since it is impossible for the assembled protective sleeve to become separated from the shaft, the protective sleeve will always fully perform its protective functions.

It is understood that this invention is susceptible to modification in order to adapt it to different usages and conditions and, accordingly, it is desired to comprehend such modifications within the invention as may fall within the scope of the appended claims.

What is claimed is:

1. In a universal joint shaft, inner and outer telescoping tubular shaft members axially moveable with respect to each other, each inner and outer tubular shaft member being connected to an element of a terminal universal joint and having cross sections suitable for the transmission of torque, an intermediate tubular shaft member telescoping between said inner and outer shaft members, stop means on said inner and outer tubular shaft members engageable with portions of said intermediate tubular shaft member for limiting the axial movement thereof, inner and outer telescoping protective tubular members enclosing said shaft members and each being rotatably mounted on an element of the terminal universal joints, an intermediate protective tubular member between said inner and outer protective tubular members, and means journaling said intermediate protective member upon said intermediate shaft member and axially positioning said intermediate members with respect to each other.

2. In a universal joint shaft as claimed in claim 1 wherein said journaling means comprises anti-friction ball bearings.

3. In a universal joint shaft as claimed in claim 1 and comprising first plate means closing the end of the outer shaft member connected to the universal joint element, second plate means in an end of said intermediate shaft member, a first rod in said outer shaft member mounted in said first plate means and extending through said second plate means, a first stop member on said first rod, a second rod mounted on said second plate means, means within said inner shaft member defining an opening through which said second rod passes, and a second stop member on said second rod engageable with said opening defining means for limiting the axial movement of said intermediate shaft member with respect to said inner shaft member.

4. In a universal joint shaft as claimed in claim 3 wherein said first rod has one end mounted in said first plate means and the other end free within said outer shaft member, said first stop member being on the free end of said first rod, said second rod having one end mounted in said second plate means and the other end free within said intermediate shaft member, said second stop member being on the free end of said second rod.

5. In a universal joint shaft as claimed in claim 1 and comprising first plate means closing the end of the outer shaft member connected to the universal joint element, second plate means in an end of said intermediate shaft member, a first inner ring within an end of said inner shaft member, a tube having one end centrally mounted in said second plate means and extending through said first inner ring into said inner shaft member, a second inner ring within said one end of the tube and an outer ring on the other end of the tube, a first rod mounted in said first plate means and extending into said tube second inner ring, a stop member on said first rod engageable with said second inner ring, said outer ring being engageable with said first inner ring.

References Cited
UNITED STATES PATENTS

| | | | |
|---|---|---|---|
| 2,598,780 | 6/1952 | Garnier | 64—23 |
| 3,449,927 | 6/1969 | Field et al. | 64—23 |
| 3,543,536 | 12/1970 | Rekow | 64—23 X |

EDWARD G. FAVORS, Primary Examiner